US012803073B2

(12) United States Patent
Takagi

(10) Patent No.: US 12,803,073 B2
(45) Date of Patent: Nov. 17, 2026

(54) BATTERY TEMPERATURE CONTROL APPARATUS

(71) Applicant: SUBARU CORPORATION, Tokyo (JP)

(72) Inventor: Yasushi Takagi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 609 days.

(21) Appl. No.: 18/462,572

(22) Filed: Sep. 7, 2023

(65) Prior Publication Data

US 2024/0113353 A1 Apr. 4, 2024

(30) Foreign Application Priority Data

Sep. 29, 2022 (JP) ................................ 2022-156863

(51) Int. Cl.
*H01M 10/625* (2014.01)
*B60K 11/02* (2006.01)
(Continued)

(52) U.S. Cl.
CPC ........... *H01M 10/625* (2015.04); *B60K 11/02* (2013.01); *B60K 11/08* (2013.01); *B60L 58/18* (2019.02);
(Continued)

(58) Field of Classification Search
CPC ............. H01M 10/625; H01M 10/613; H01M 10/633; H01M 10/6561; H01M 10/6569;
(Continued)

(56) References Cited

U.S. PATENT DOCUMENTS

2015/0144614 A1* 5/2015 Kim .................. H01M 10/6571 219/494
2015/0231988 A1 8/2015 Hisada
2016/0362018 A1* 12/2016 Tanaka .............. H01M 10/6563

FOREIGN PATENT DOCUMENTS

EP 4212371 A1 * 7/2023 ............... B60K 1/00
JP 2014-79152 A 5/2014
(Continued)

OTHER PUBLICATIONS

English Translation of WO 2023226432 A1—Temperature control apparatus, temperature control method, and vehicle; Huawei Tech Co Ltd; Nov. 30, 2023 with priority to May 27, 2022 (Year: 2022).*

*Primary Examiner* — Adam J Francis
(74) *Attorney, Agent, or Firm* — Rimon P.C.

(57) ABSTRACT

A battery temperature control apparatus includes: a high voltage battery installed in a vehicle; a low voltage battery installed in the vehicle; a first temperature control system configured to adjust a temperature of the low voltage battery using air supplied from outside the vehicle; and a second temperature control system that is different from the first temperature control system and configured to adjust a temperature of the high voltage battery using a heat medium circulating within the vehicle. The second temperature control system includes: a first heat exchanger configured to exchange heat between the high voltage battery and the heat medium; and a second heat exchanger configured to exchange heat between the low voltage battery and the heat medium. The temperature of the low voltage battery is adjustable using the heat medium supplied to the second heat exchanger.

4 Claims, 4 Drawing Sheets

(51) Int. Cl.
*B60K 11/08* (2006.01)
*B60L 58/18* (2019.01)
*B60L 58/26* (2019.01)
*B60L 58/27* (2019.01)
*H01M 10/613* (2014.01)
*H01M 10/633* (2014.01)
*H01M 10/6561* (2014.01)
*H01M 10/6569* (2014.01)

(52) U.S. Cl.
CPC ............... *B60L 58/26* (2019.02); *B60L 58/27* (2019.02); *H01M 10/613* (2015.04); *H01M 10/633* (2015.04); *H01M 10/6561* (2015.04); *H01M 10/6569* (2015.04); *H01M 2220/20* (2013.01)

(58) Field of Classification Search
CPC .. H01M 10/486; H01M 10/615; H01M 10/63; H01M 2220/20; B60K 11/02; B60K 11/08; B60K 11/06; B60K 1/00; B60K 2001/005; B60K 2001/008; B60L 58/18; B60L 58/26; B60L 58/27; B60L 58/20; B60L 2240/545; B60L 1/02
See application file for complete search history.

(56) References Cited

FOREIGN PATENT DOCUMENTS

| | | | | | |
|---|---|---|---|---|---|
| JP | 2023000575 | A | * | 1/2023 | |
| WO | WO-2023226432 | A1 | * | 11/2023 | ............ H01M 10/48 |

* cited by examiner

BATTERY TEMPERATURE CONTROL APPARATUS

CROSS-REFERENCE TO RELATED APPLICATIONS

The present application claims priority from Japanese Patent Application No. 2022-156863 filed on Sep. 29, 2022, the entire contents of which are hereby incorporated by reference.

BACKGROUND

The disclosure relates to a battery temperature control apparatus.

For example, Japanese Unexamined Patent Application Publication (JP-A) No. 2014-79152 discloses technology for a vehicle equipped with a high voltage battery and a low voltage battery, which adjusts the temperature of each battery. In JP-A No. 2014-79152, the temperature of the high voltage battery is adjusted by a refrigerant (long life coolant (LLC)), and the temperature of the low voltage battery is adjusted by air cooling.

SUMMARY

An aspect of the disclosure provides a battery temperature control apparatus. The temperature control apparatus includes a high voltage battery, a low voltage battery, a first temperature control system, and a second temperature control system. The high voltage battery is installed in a vehicle. The low voltage battery is installed in the vehicle. The first temperature control system configured to adjust a temperature of the low voltage battery using air supplied from outside the vehicle. The second temperature control system is different from the first temperature control system and configured to adjust a temperature of the high voltage battery using a heat medium circulating within the vehicle. The second temperature control system includes a first heat exchanger and a second heat exchanger. The first heat exchanger is configured to exchange heat between the high voltage battery and the heat medium. The second heat exchanger is configured to exchange heat between the low voltage battery and the heat medium. The temperature of the low voltage battery is adjustable using the heat medium supplied to the second heat exchanger.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

For a low voltage battery and a high voltage battery, appropriate temperature ranges in which charging and discharging operations can be appropriately performed are determined in advance. Here, it is assumed that, for example, the low voltage battery is formed of a battery having a narrow appropriate temperature range. In this case, depending on the temperature of the air used to adjust the temperature of the low voltage battery and the heat generation state of the low voltage battery, the temperature of the low voltage battery may not be sufficiently adjusted by air cooling.

Accordingly, the temperature of the low voltage battery is also adjusted by a refrigerant for adjusting the temperature of the high voltage battery. However, because the usage conditions of the low voltage battery and the high voltage battery are different, the temperature of the low voltage battery and the temperature of the high voltage battery change independently of each other. In that case, for example, the high voltage battery may be overcooled outside the appropriate temperature range by cooling the low voltage battery, and the temperature of the low voltage battery and the temperature of the high voltage battery may not be appropriately adjusted.

It is desirable to provide a battery temperature control apparatus capable of appropriately adjusting the temperature of a low voltage battery and the temperature of a high voltage battery.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
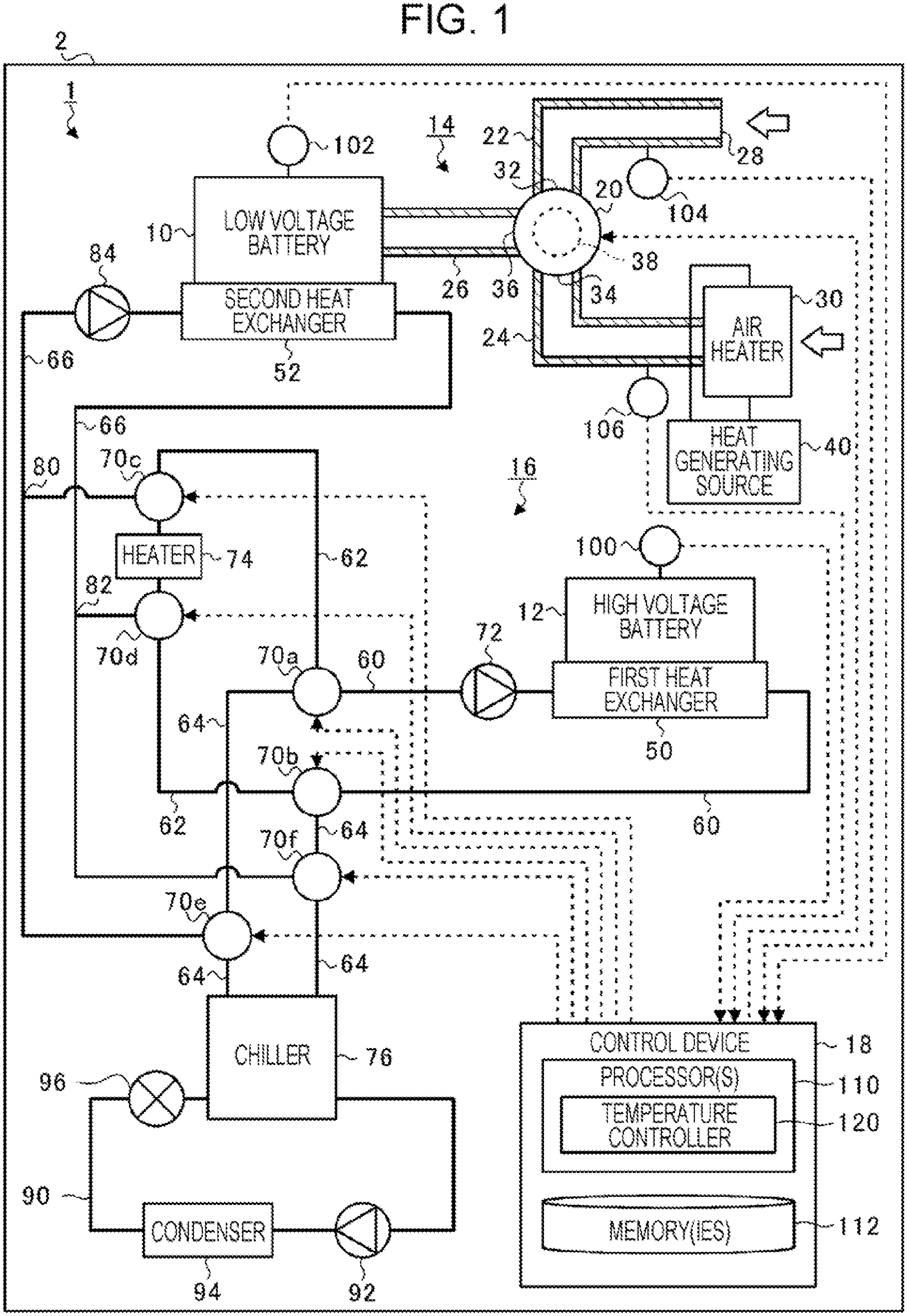
FIG. 1 is a schematic diagram illustrating the configuration of a battery temperature control apparatus according to an embodiment.

FIG. 1 is a schematic diagram illustrating the configuration of a battery temperature control apparatus 1 according to the present embodiment. Hereinafter, adjusting the temperature of a battery may be referred to as temperature control. The battery temperature control apparatus 1 is applied to a vehicle 2. The vehicle 2 is, for example, an electric vehicle or a hybrid electric vehicle.

The battery temperature control apparatus 1 includes a low voltage battery 10, a high voltage battery 12, a first temperature control system 14, a second temperature control system 16, and a control device 18. The battery temperature control apparatus 1 is applied to the vehicle 2 in which both the low voltage battery 10 and the high voltage battery 12 are installed.

The low voltage battery 10 is a secondary battery that can be charged and discharged, such as a lithium-ion battery. By using a lithium-ion battery as the low voltage battery 10, the use of lead can be avoided compared to an aspect in which a lead-acid battery is used as the low voltage battery 10, and the vehicle 2 which is environmentally friendly can be realized.

The voltage of the low voltage battery 10 is, for example, 12 V or 24 V, and is lower than the voltage of the high voltage battery 12 described later. The low voltage battery 10 supplies power to each device coupled to a low voltage system in the vehicle 2, such as a vehicle dynamic control (VDC) and an electric power steering (EPS). Note that the devices to which the low voltage battery 10 supplies power are not limited to those mentioned in the example, and may be any device coupled to the low voltage system.

The high voltage battery 12 is a secondary battery that can be charged and discharged, such as a lithium-ion battery. The voltage of the high voltage battery 12 is, for example, a certain voltage higher than or equal to 100 V, and is higher than the voltage of the low voltage battery 10. The high voltage battery 12 supplies power to each device coupled to a high voltage system in the vehicle 2, such as a motor, which is a driving source for traveling of the vehicle 2. Note that the devices to which the high voltage battery 12 supplies power are not limited to those mentioned in the example, and may be any device coupled to the high voltage system. In addition, the high voltage battery 12 may be capable of supplying power to the low voltage system through a direct-current to direct-current (DC-to-DC) converter.

In the battery temperature control apparatus 1 of the present embodiment, the low voltage battery 10 and the high voltage battery 12 are formed of batteries of the same type. For example, the low voltage battery 10 and the high voltage battery 12 are both lithium-ion batteries.

Here, for each of the low voltage battery 10 and the high voltage battery 12, an appropriate temperature range which is a temperature range in which charging and discharging operations can be appropriately performed is determined in advance. Although charging and discharging can be performed even when the temperature of the battery falls outside the appropriate temperature range, if the temperature of the battery falls outside the appropriate temperature range, there is a risk that a sufficient amount of charging or discharging may not be performed. The appropriate temperature range differs according to the type of battery. Lithium-ion batteries have a narrower appropriate temperature range than lead-acid batteries. For batteries with a narrow appropriate temperature range, it is necessary to actively adjust the temperature of the battery so that the temperature of the battery falls within the appropriate temperature range. To that end, the battery temperature control apparatus 1 adjusts the temperature of the low voltage battery 10 and the temperature of the high voltage battery 12.

Moreover, when the low voltage battery 10 and the high voltage battery 12 are formed of batteries of the same type, the appropriate temperature range of the low voltage battery 10 and the appropriate temperature range of the high voltage battery 12 may be substantially the same or close to each other. In such a case, the low voltage battery 10 and the high voltage battery 12 can be configured to be temperature-controlled using the same temperature control system.

Here, for example, a situation may arise in which the power consumption of the low voltage battery 10 is relatively large due to frequent operation of the VDC, EPS, and the like, and the power consumption of the high voltage battery 12 is relatively small due to the low output of the motor for traveling, and the like. In this case, the power consumption of the high voltage battery 12 is small and thus the temperature of the high voltage battery 12 falls within the appropriate temperature range, whereas the power consumption of the low voltage battery 10 is large and thus the temperature of the low voltage battery 10 may fall outside the appropriate temperature range. In this manner, the temperature of the low voltage battery 10 and the temperature of the high voltage battery 12 change independently of each other.

In view of the above, although the low voltage battery 10 and the high voltage battery 12 can be configured to be temperature-controlled using the same temperature control system, it is more preferable to independently adjust the temperature of the low voltage battery 10 and the temperature of the high voltage battery 12.

Thus, the battery temperature control apparatus 1 of the present embodiment includes two temperature control systems, the first temperature control system 14 and the second temperature control system 16. The first temperature control system 14 performs temperature control using air supplied from outside the vehicle 2. The second temperature control system 16 performs temperature control using a heat medium circulating within the vehicle 2. The first temperature control system 14 is used for controlling the temperature of the low voltage battery 10. The second temperature control system 16 is configured to be used for the temperature control of the high voltage battery 12, but can also be used for the temperature control of the low voltage battery 10. In short, the battery temperature control apparatus 1 is configured to be capable of controlling the temperature of the low voltage battery 10 using both the first temperature control system 14 and the second temperature control system 16.

Accordingly, for example, the temperature of the low voltage battery 10 may be adjusted by the first temperature control system 14 in a situation where the temperature of the low voltage battery 10 is adjustable within the range of the temperature control capability of the first temperature control system 14. In contrast, when it is necessary to control the temperature of the low voltage battery 10 beyond the range of the temperature control capability of the first temperature control system 14, the temperature of the low voltage battery 10 may be controlled by the second temperature control system 16. In this manner, the temperature control system may be switched in accordance with the temperature control capability of the first temperature control system 14 and the temperature of the low voltage battery 10. Accordingly, the temperature of the low voltage battery 10 can be adjusted appropriately. Note that the temperature adjustment capability of the first temperature control system 14 changes in accordance with the temperature of the air supplied to the first temperature control system 14 and the temperature of the air supplied to and then heated by the first temperature control system 14.

In the meantime, while the temperature of the low voltage battery 10 is being controlled by the first temperature control system 14, the temperature of the low voltage battery 10 may not be controlled by the second temperature control system 16. In doing so, while the temperature of the low voltage battery 10 is being controlled by the first temperature control system 14, the temperature of the low voltage battery 10 is controlled by the first temperature control system 14 alone, and the temperature of the high voltage battery 12 is controlled by the second temperature control system 16 alone. In short, the temperature of the low voltage battery 10 and the temperature of the high voltage battery 12 can be adjusted independently of each other. This allows the temperature of the low voltage battery 10 to be appropriately adjusted irrespective of the temperature of the high voltage battery 12, and allows the temperature of the high voltage battery 12 to be appropriately adjusted irrespective of the temperature of the low voltage battery 10.

In this manner, the battery temperature control apparatus 1 of the present embodiment is capable of appropriately adjusting the temperature of the low voltage battery 10 and the temperature of the high voltage battery 12. Hereinafter, the battery temperature control apparatus 1 will be described in detail.

The first temperature control system 14 is configured to be capable of adjusting the temperature of the low voltage battery 10 using air supplied from outside the vehicle 2. The first temperature control system 14 includes a three-way valve 20, a first duct 22, a second duct 24, a third duct 26, an air inlet 28, and an air heater 30.

The three-way valve 20 has three ports in total, a first port 32, a second port 34, and a third port 36. An internal flow path 38 is formed inside the three-way valve 20. The three-way valve 20 is configured to be capable of switching the internal flow path 38 leading to the first port 32, the second port 34, and the third port 36. The three-way valve 20 will be described in detail later.

The first duct 22 is formed in a tubular shape. A first end of two ends of the first duct 22 is coupled to the first port 32 of the three-way valve 20. The air inlet 28 is formed at a second end of the two ends of the first duct 22. The first duct 22 allows the first port 32 of the three-way valve 20 to be in communication with the air inlet 28. The air inlet 28 can obtain air from outside the vehicle 2. In short, air outside the vehicle 2 is supplied into the first duct 22 through the air inlet 28. Hereinafter, for convenience of explanation, air obtained through the air inlet 28 may be referred to as air intake.

The second duct 24 is formed in a tubular shape. A first end of two ends of the second duct 24 is coupled to the second port 34 of the three-way valve 20. A second end of the two ends of the second duct 24 is coupled to the air heater 30. The second duct 24 allows the second port 34 of the three-way valve 20 to be in communication with the air heater 30.

The air heater 30 is a heat exchanger such as a radiator. The air heater 30 can heat air supplied to the first temperature control system 14. The air heater 30 is coupled to a heat generating source 40. The heat generating source 40 is, for example, a motor or the like, but may be any device configured to generate heat. By performing heat exchange between the heat generated by the heat generating source 40 and the air supplied to the first temperature control system 14, the air heater 30 heats the air supplied to the first temperature control system 14 and supplies the heated air into the second duct 24. Hereinafter, for convenience of explanation, of the air supplied to the first temperature control system 14, air heated by the air heater 30 may be referred to as heated air. Moreover, of the air supplied to the first temperature control system 14, air not heated by the air heater 30, that is, air supplied to the first port 32 of the three-way valve 20 through the air inlet 28 and the first duct 22, may be referred to as unheated air.

Note that the air heater 30 is not limited to a radiator, and may be any device capable of heating air, such as a heater. When the air heater 30 functions as the heat generating source 40, the heat generating source 40 may be omitted.

The third duct 26 is formed in a tubular shape. A first end of two ends of the third duct 26 is coupled to the third port 36 of the three-way valve 20. A second end of the two ends of the third duct 26 is coupled to the wall of a battery pack where the low voltage battery 10 is accommodated. The second end of the third duct 26 is open within the battery pack of the low voltage battery 10. The third duct 26 allows the third port 36 of the three-way valve 20 to be in communication with the low voltage battery 10.

Figure 2:
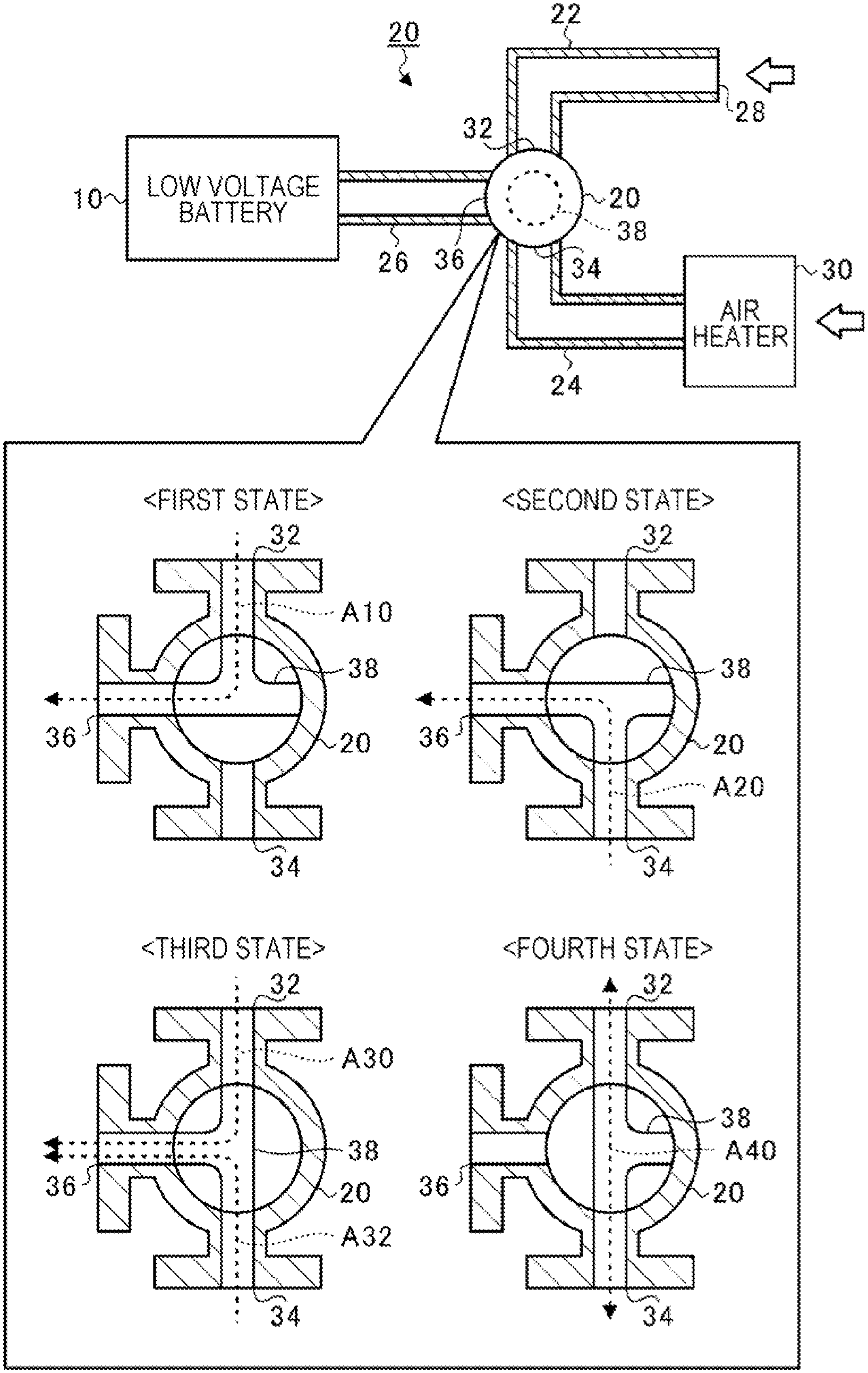
FIG. 2 is a diagram illustrating the states of a three-way valve.

FIG. 2 is a diagram illustrating the states of the three-way valve 20. As illustrated in FIG. 2, the three-way valve 20 can be in any of four states, a first state, a second state, a third state, and a fourth state. The three-way valve 20 is capable of switching from any one state to another, among the first state, the second state, the third state, and the fourth state.

The internal flow path 38 of the three-way valve 20 is formed in a T-shaped tubular shape. The internal flow path 38 is rotatably accommodated in the three-way valve 20. The three-way valve 20 can be in a state according to the orientation of the internal flow path 38. As the internal flow path 38 rotates in the three-way valve 20, the three-way valve 20 can switch the state.

The first state is a state in which the first port 32 and the third port 36 are in communication, and the second port 34 is not in communication with either the first port 32 or the third port 36. As indicated by dashed-line arrow A10 in FIG. 2, in the first state, a cooling flow path in which the first port 32 and the third port 36 are in communication is formed.

When the three-way valve 20 is in the first state, air outside the vehicle 2, obtained through the air inlet 28, is supplied to the low voltage battery 10 through the first duct 22, the three-way valve 20, and the third duct 26. In this case, the first temperature control system 14 can cool the low voltage battery 10 using unheated air flowing through the cooling flow path.

The second state is a state in which the second port 34 and the third port 36 are in communication, and the first port 32 is not in communication with either the second port 34 or the third port 36. As indicated by dashed-line arrow A20 in FIG. 2, in the second state, a heating flow path in which the second port 34 and the third port 36 are in communication is formed.

When the three-way valve 20 is in the second state, air heated by the air heater 30 is supplied to the low voltage battery 10 through the second duct 24, the three-way valve 20, and the third duct 26. In this case, the first temperature control system 14 can heat the low voltage battery 10 using heated air which is heated by the air heater 30 and which flows through the heating flow path.

The third state is a state in which the first port 32, the second port 34, and the third port 36 are in communication. As indicated by dashed-line arrows A30 and A32 in FIG. 2, in the third state, a mixed flow path in which the first port 32 and the third port 36 are in communication, and the second port 34 and the third port 36 are in communication is formed.

When the three-way valve 20 is in the third state, unheated air flowing through the first duct 22 and heated air which is heated by the air heater 30 and which flows through the second duct 24 are mixed inside the three-way valve 20. Hereinafter, for convenience of explanation, the mixture of unheated air and heated air may be referred to as mixed air.

When the three-way valve 20 is in the third state, mixed air mixed inside the three-way valve 20 is supplied to the low voltage battery 10 through the third duct 26. In this case, the first temperature control system 14 can adjust the temperature of the low voltage battery 10 using the mixed air supplied from the three-way valve 20.

The fourth state is a state in which the first port 32 and the second port 34 are in communication, and the third port 36 is not in communication with either the first port 32 or the second port 34. As indicated by dashed-line arrow A40 in FIG. 2, in the fourth state, a bypass flow path in which the first port 32 and the second port 34 are in communication is formed. In the fourth state, because the third port 36 is blocked from the first port 32 and the second port 34, the above-described cooling flow path, heating flow path, and mixed flow path are not formed. In short, in the fourth state, neither unheated air nor heated air is supplied to the low voltage battery 10.

When the three-way valve 20 is in the fourth state, unheated air flowing through the first duct 22 can flow through the air heater 30 through the three-way valve 20 and the second duct 24. Moreover, when the three-way valve 20 is in the fourth state, heated air flowing through the second duct 24 can flow to the outside of the vehicle 2 through the three-way valve 20, the first duct 22, and the air inlet 28.

In this manner, the three-way valve 20 is configured to be capable of switching from any one flow path to another, among the above-described cooling flow path, heating flow path, mixed flow path, and bypass flow path.

Note that the three-way valve 20 is not limited to an aspect in which the three-way valve 20 can be in any of the four states including the first state to the fourth state. For example, the three-way valve 20 may be in an aspect where the three-way valve 20 can be in one of two states, the first state and the second state, and the third state and the fourth state are omitted. That is, the three-way valve 20 may be configured to be capable of switching between at least the first state and the second state, i.e., capable of switching between the cooling flow path and the heating, flow path described above.

In addition, the first temperature control system 14 is configured in such a manner that air heated by the air heater 30 is obtained separately from air obtained from the air inlet 28. However, the first temperature control system 14 may be configured in such a manner that part of air obtained from the air inlet 28 is supplied to the air heater 30.

Referring back to FIG. 1, the second temperature control system 16 is a temperature control system different from the first temperature control system 14. The second temperature control system 16 is configured to be capable of adjusting the temperature of the high voltage battery 12 using a heat medium circulating within the vehicle 2. The heat medium circulates along the second temperature control system 16, and can exchange heat at each of the elements constituting the second temperature control system 16. The heat medium is, for example, water or the like, but may be any fluid that can be used for heat exchange. The second temperature control system 16 is configured to be not only capable of adjusting the temperature of the high voltage battery 12, but also capable of adjusting the temperature of the low voltage battery 10, which will be described later. In addition, for example, the flow path of air in the first temperature control system 14 and the flow path of the heat medium in the second temperature control system 16 are independent of each other so that the air in the first temperature control system 14 does not mix with the heat medium in the second temperature control system 16.

The second temperature control system 16 includes a first heat exchanger 50. The first heat exchanger 50 is disposed in contact with the high voltage battery 12. For example, the first heat exchanger 50 is formed in a plate shape in which the heat medium flows therein, and the high voltage battery 12 is disposed on top of the first heat exchanger 50. The first heat exchanger 50 is configured to be capable of exchanging heat between the high voltage battery 12 and the heat medium.

The second temperature control system 16 includes a second heat exchanger 52. The second heat exchanger 52 is disposed in contact with the low voltage battery 10. For example, the second heat exchanger 52 is formed in a plate shape in which the heat medium flows therein, and the low voltage battery 10 is disposed on top of the second heat exchanger 52. The second heat exchanger 52 is configured to be capable of exchanging heat between the low voltage battery 10 and the heat medium.

The second temperature control system 16 includes first common piping 60, heating piping 62, cooling piping 64, and second common piping 66. The heat medium flows in each of the first common piping 60, the heating piping 62, the cooling piping 64, and the second common piping 66.

The second temperature control system 16 includes a first switching valve 70*a*, a second switching valve 70*b*, a third switching valve 70*c*, a fourth switching valve 70*d*, a fifth switching valve 70*e*, and a sixth switching valve 70*f*. The first switching valve 70*a*, the second switching valve 70*b*, the third switching valve 70*c*, the fourth switching valve 70*d*, the fifth switching valve 70*e*, and the sixth switching valve 70*f* may be collectively referred to as switching valves. Each of the switching valves of the second temperature control system 16 is, for example, a three-way valve.

The first common piping 60 extends from the first switching valve 70*a* and is coupled to the first heat exchanger 50. The first common piping 60 further extends from the first heat exchanger 50 and is coupled to the second switching valve 70*b*. The second temperature control system 16 includes a first pump 72. The first pump 72 is provided between the first switching valve 70*a* of the first common piping 60 and the first heat exchanger 50. The first pump 72 causes the heat medium in the first common piping 60 to flow in a direction from the first switching valve 70*a* towards the first heat exchanger 50.

The second temperature control system 16 includes a heater 74. The heating piping 62 extends from the second switching valve 70*b* and is coupled to the first switching valve 70*a* via the heater 74. The heater 74 is provided between the second switching valve 70*b* of the heating piping 62 and the first switching valve 70*a*. The heater 74 heats the heat medium flowing in the heating piping 62. The heater 74 is, for example, a positive temperature coefficient (PTC) heater, but may be any heater capable of heating a heat medium.

The second temperature control system 16 includes a chiller 76. The cooling piping 64 extends from the second switching valve 70*b* and is coupled to the first switching valve 70*a* via the chiller 76. The chiller 76 is provided between the second switching valve 70*b* of the cooling piping 64 and the first switching valve 70*a*. The chiller 76 cools the heat medium flowing in the cooling piping 64.

The first switching valve 70*a* and the second switching valve 70*b* can switch, of the heating piping 62 and the cooling piping 64, piping to be in communication with the first common piping 60.

For example, it is assumed that, with the first switching valve 70*a* and the second switching valve 70*b*, the first common piping 60 and the heating piping 62 are in communication, and the cooling piping 64 is blocked from the first common piping 60 and the heating piping 62. In this case, the heat medium circulates through the heating piping 62 and the first common piping 60. In short, the heat medium heated by the heater 74 is supplied to the first heat exchanger 50. As a result, the high voltage battery 12 can be heated by heat exchange with the heat medium supplied to the first heat exchanger 50.

In contrast, it is assumed that, with the first switching valve 70*a* and the second switching valve 70*b*, the first common piping 60 and the cooling piping 64 are in communication, and the heating piping 62 is blocked from the first common piping 60 and the cooling piping 64. In this case, the heat medium circulates through the cooling piping

64 and the first common piping 60. In short, the heat medium cooled by the chiller 76 is supplied to the first heat exchanger 50. As a result, the high voltage battery 12 can be cooled by heat exchange with the heat medium supplied to the first heat exchanger 50.

The third switching valve 70*c* is provided between the heater 74 of the heating piping 62 and the first switching valve 70*a*. The fourth switching valve 70*d* is provided between the second switching valve 70*b* of the heating piping 62 and the heater 74.

The fifth switching valve 70*e* is provided between the chiller 76 of the cooling piping 64 and the first switching valve 70*a*. The sixth switching valve 70*f* is provided between the second switching valve 70*b* of the cooling piping 64 and the chiller 76.

The second common piping 66 extends from the third switching valve 70*c* as well as from the fifth switching valve 70*e*, and they merge at a merging point 80. The second common piping 66 extends from the merging point 80 and is coupled to the second heat exchanger 52. The second common piping 66 further extends from the second heat exchanger 52 and branches into two at a branching point 82. In the second common piping 66, one of the two branching at the branching point 82 is coupled to the fourth switching valve 70*d*, and the other of the two branching at the branching point 82 is coupled to the sixth switching valve 70*f*.

The second temperature control system 16 includes a second pump 84. The second pump 84 is provided between the merging point 80 of the second common piping 66 and the second heat exchanger 52. The second pump 84 causes the heat medium in the second common piping 66 to flow in a direction from the third switching valve 70*c* or the fifth switching valve 70*e* towards the second heat exchanger 52.

The third switching valve 70*c* and the fourth switching valve 70*d* can switch the coupling between the second common piping 66 and the heating piping 62 on and off.

For example, it is assumed that, with the third switching valve 70*c* and the fourth switching valve 70*d*, the second common piping 66 and the heating piping 62 are in communication. In this case, the heat medium circulates through the heater 74 of the heating piping 62 and the second common piping 66. In short, the heat medium heated by the heater 74 is supplied to the second heat exchanger 52. As a result, the low voltage battery 10 can be heated by heat exchange with the heat medium supplied to the second heat exchanger 52.

In contrast, it is assumed that, with the third switching valve 70*c* and the fourth switching valve 70*d*, the second common piping 66 is blocked from the heating piping 62. In this case, because the heat medium heated by the heater 74 is not supplied to the second common piping 66, heating of the low voltage battery 10 by the second temperature control system 16 is not performed.

Note that, when the second common piping 66 is in communication with the heating piping 62, the heat medium heated by the heater 74 may be supplied to the second heat exchanger 52 through the second common piping 66 as well as to the first heat exchanger 50 through the first common piping 60. Alternatively, when the second common piping 66 is in communication with the heating piping 62, the heat medium heated by the heater 74 may be supplied to the second heat exchanger 52 alone through the second common piping 66, without being supplied to the first common piping 60 and the first heat exchanger 50.

The fifth switching valve 70*e* and the sixth switching valve 70*f* can switch the coupling between the second common piping 66 and the cooling piping 64 on and off.

For example, it is assumed that, with the fifth switching valve 70*e* and the sixth switching valve 70*f*, the second common piping 66 and the cooling piping 64 are in communication. In this case, the heat medium circulates through the chiller 76 of the cooling piping 64 and the second common piping 66. In short, the heat medium cooled by the chiller 76 is supplied to the second heat exchanger 52. As a result, the low voltage battery 10 can be cooled by heat exchange with the heat medium supplied to the second heat exchanger 52.

In contrast, it is assumed that, with the fifth switching valve 70*e* and the sixth switching valve 70*f*, the second common piping 66 is blocked from the cooling piping 64. In this case, because the heat medium cooled by the chiller 76 is not supplied to the second common piping 66, cooling of the low voltage battery 10 by the second temperature control system 16 is not performed.

Note that, when the second common piping 66 is in communication with the cooling piping 64, the heat medium cooled by the chiller 76 may be supplied to the second heat exchanger 52 through the second common piping 66 as well as to the first heat exchanger 50 through the first common piping 60. Alternatively, when the second common piping 66 is in communication with the cooling piping 64, the heat medium cooled by the chiller 76 may be supplied to the second heat exchanger 52 alone through the second common piping 66, without being supplied to the first common piping 60 and the first heat exchanger 50.

The second temperature control system 16 includes a sub-cooling piping 90, a compressor 92, a condenser 94, and an expansion valve 96. The sub-cooling piping 90 is provided to extend from the chiller 76 and return to the chiller 76 in the order of the compressor 92, the condenser 94, and the expansion valve 96. The sub-cooling piping 90 forms a flow path that is separate from the cooling piping 64. Inside the sub-cooling piping 90, a sub-heat medium circulates separately from the heat medium inside the cooling piping 64. The sub-heat medium is, for example, water or the like, but may be any fluid that can be used for heat exchange.

The compressor 92 compresses the sub-heat medium supplied from the chiller 76 through the sub-cooling piping 90 and sends it to the condenser 94. The condenser 94 exchanges heat between the air outside the vehicle 2 and the sub-heat medium compressed by the compressor 92 to release the heat of the sub-heat medium outside the vehicle 2. The sub-heat medium inside the condenser 94 is cooled under high pressure and thus transitions from the gas phase to the liquid phase. The sub-heat medium after being heat-exchanged by the condenser 94 is sent to the expansion valve 96.

The expansion valve 96 sprays the sub-heat medium supplied from the condenser 94 to the interior of the chiller 76. The sprayed sub-heat medium undergoes a rapid drop in pressure and transitions to the gas phase. Due to such vaporization, the temperature of the sub-heat medium decreases. The chiller 76 exchanges heat between the temperature-reduced sub-heat medium in the sub-cooling piping 90 and the heat medium in the cooling piping 64, thereby cooling the heat medium in the cooling piping 64.

The battery temperature control apparatus 1 includes a first battery temperature sensor 100, a second battery temperature sensor 102, an intake air temperature sensor 104, and a heated air temperature sensor 106.

The first battery temperature sensor 100 detects the temperature of the high voltage battery 12. The second battery temperature sensor 102 detects the temperature of the low voltage battery 10. The intake air temperature sensor 104 is provided in the first duct 22. The intake air temperature sensor 104 detects the temperature of the air obtained through the air inlet 28 to flow through the first duct 22, i.e., the temperature of the unheated air. The heated air temperature sensor 106 is provided in the second duct 24. The heated air temperature sensor 106 detects the temperature of the air heated by the air heater 30 to flow through the second duct 24, i.e., the temperature of the heated air.

The control device 18 includes one or more processors 110, and one or more memories 112 coupled to the processor(s) 110. The memory(ies) 112 includes a read-only memory (ROM) in which a program or the like is stored, and a random-access memory (RAM) as a work area. The processor(s) 110 of the control device 18 cooperates with the program included in the memory(ies) 112 to control the entire vehicle 2. By executing the program, the processor(s) 110 functions as a temperature controller 120 as well.

The temperature controller 120 obtains the temperature of the high voltage battery 12 detected by the first battery temperature sensor 100. The temperature controller 120 adjusts the temperature of the high voltage battery 12 based on the temperature of the high voltage battery 12.

When the temperature of the high voltage battery 12 is higher than the upper limit temperature of the appropriate temperature range of the high voltage battery 12, the temperature controller 120 executes cooling of the high voltage battery 12 using a heat medium cooled by the chiller 76 in the second temperature control system 16. In more detail, the temperature controller 120 causes the first switching valve 70*a* and the second switching valve 70*b* to be in a state in which the first common piping 60 and the cooling piping 64 are in communication, and the heating piping 62 is blocked from the first common piping 60 and the cooling piping 64. By allowing the first common piping 60 and the cooling piping 64 to be in communication, the heat medium cooled by the chiller 76 is supplied to the first heat exchanger 50 through the cooling piping 64 and the first common piping 60. This allows the high voltage battery 12 to be cooled, thereby returning the temperature of the high voltage battery 12 to within the appropriate temperature range.

When the temperature of the high voltage battery 12 is lower than the lower limit temperature of the appropriate temperature range of the high voltage battery 12, the temperature controller 120 executes heating of the high voltage battery 12 using a heat medium heated by the heater 74 in the second temperature control system 16. In more detail, the temperature controller 120 causes the first switching valve 70*a* and the second switching valve 70*b* to be in a state in which the first common piping 60 and the heating piping 62 are in communication, and the cooling piping 64 is blocked from the first common piping 60 and the heating piping 62. By allowing the first common piping 60 and the heating piping 62 to be in communication, the heat medium heated by the heater 74 is supplied to the first heat exchanger 50 through the heating piping 62 and the first common piping 60. This allows the high voltage battery 12 to be heated, thereby returning the temperature of the high voltage battery 12 to within the appropriate temperature range.

Note that the temperature controller 120 can switch the state of the first switching valve 70*a* and the second switching valve 70*b* by controlling a certain actuator configured to drive the first switching valve 70*a* and the second switching valve 70*b*.

The temperature controller 120 obtains the temperature of the low voltage battery 10 detected by the second battery temperature sensor 102. The temperature controller 120 adjusts the temperature of the low voltage battery 10 based on the temperature of the low voltage battery 10.

When the temperature of the low voltage battery 10 is higher than the upper limit temperature of the appropriate temperature range of the low voltage battery 10, the temperature controller 120 compares the temperature of the air supplied to the first temperature control system 14, i.e., the temperature of the unheated air, and the temperature of the low voltage battery 10.

If the temperature of the air supplied to the first temperature control system 14 is lower than the temperature of the low voltage battery 10, the low voltage battery 10 can be effectively cooled by the air supplied to the first temperature control system 14. Accordingly, if the temperature of the air supplied to the first temperature control system 14 is lower than the temperature of the low voltage battery 10, the temperature controller 120 executes cooling of the low voltage battery 10 using the first temperature control system 14. In more detail, the temperature controller 120 causes the three-way valve 20 of the first temperature control system 14 to be in the first state. Because the first duct 22 and the third duct 26 are in communication in the first state, the unheated air is supplied to the low voltage battery 10. This allows the low voltage battery 10 to be cooled, thereby returning the temperature of the low voltage battery 10 to within the appropriate temperature range.

Note that the temperature controller 120 can switch the state of the three-way valve 20 of the first temperature control system 14 by controlling a certain actuator configured to drive the three-way valve 20.

If the temperature of the air supplied to the first temperature control system 14 is greater than or equal to the temperature of the low voltage battery 10, the low voltage battery 10 will not be sufficiently cooled by the air supplied to the first temperature control system 14. Therefore, in such a case, cooling of the low voltage battery 10 is executed by the second temperature control system 16. That is, if the temperature of the air supplied to the first temperature control system 14 is greater than or equal to the temperature of the low voltage battery 10, the temperature controller 120 executes cooling of the low voltage battery 10 using the second temperature control system 16. In more detail, the temperature controller 120 causes the fifth switching valve 70*e* and the sixth switching valve 70*f* to be in a state in which the second common piping 66 and the cooling piping 64 are in communication. In addition, the temperature controller 120 causes the third switching valve 70*c* and the fourth switching valve 70*d* to be in a state in which the second common piping 66 is blocked from the heating piping 62. By allowing the second common piping 66 and the cooling piping 64 to be in communication, the heat medium cooled by the chiller 76 is supplied to the second heat exchanger 52 through the cooling piping 64 and the second common piping 66. This allows the low voltage battery 10 to be cooled, thereby returning the temperature of the low voltage battery 10 to within the appropriate temperature range.

Note that the temperature controller 120 can switch the state of the fifth switching valve 70*e* and the sixth switching valve 70*f* by controlling a certain actuator configured to drive the fifth switching valve 70*e* and the sixth switching valve 70*f*. The temperature controller 120 can switch the state of the third switching valve 70*c* and the fourth switching valve 70*d* by controlling a certain actuator configured to drive the third switching valve 70*c* and the fourth switching valve 70*d*.

By the way, when the heat generation of the low voltage battery 10 is relatively large, even if the low voltage battery 10 is cooled by the first temperature control system 14 for a long time, a situation may occur in which the temperature of the low voltage battery 10 does not return to within the appropriate temperature range.

Accordingly, when a certain time has elapsed since the time point at which the low voltage battery 10 is started to be cooled by the first temperature control system 14, the temperature controller 120 may stop cooling the low voltage battery 10 using the first temperature control system 14 and switch to cooling the low voltage battery 10 using the second temperature control system 16. Cooling with a heat medium usually has a higher cooling capability than cooling with unheated air. From this, cooling is switched from cooling using the first temperature control system 14 to cooling using the second temperature control system 16, which has a higher cooling capability than the first temperature control system 14.

For example, the temperature controller 120 causes the three-way valve 20 of the first temperature control system 14 to be in the fourth state. The temperature controller 120 causes the fifth switching valve 70*e* and the sixth switching valve 70*f* to be in a state in which the second common piping 66 and the cooling piping 64 are in communication. In addition, the temperature controller 120 causes the third switching valve 70*c* and the fourth switching valve 70*d* to be in a state in which the second common piping 66 is blocked from the heating piping 62. This allows the low voltage battery 10 to be further cooled, thereby returning the temperature of the low voltage battery 10 to within the appropriate temperature range, even if the heat generation of the low voltage battery 10 is relatively large.

Here, cooling of the low voltage battery 10 using the first temperature control system 14 is stopped, and then cooling using the first temperature control system 14 is switched to cooling using the second temperature control system 16. However, the temperature controller 120 may continue to cool the low voltage battery 10 using the first temperature control system 14, and further may additionally cool the low voltage battery 10 using the second temperature control system 16.

When the temperature of the low voltage battery 10 is lower than the lower limit temperature of the appropriate temperature range of the low voltage battery 10, the temperature controller 120 compares the temperature of the air heated by the air heater 30, i.e., the temperature of the heated air, and the temperature of the low voltage battery 10.

If the temperature of the air heated by the air heater 30 is higher than the temperature of the low voltage battery 10, the low voltage battery 10 can be effectively heated by the air heated by the air heater 30. Accordingly, if the temperature of the air heated by the air heater 30 is higher than the temperature of the low voltage battery 10, the temperature controller 120 executes heating of the low voltage battery 10 using the first temperature control system 14. In more detail, the temperature controller 120 causes the three-way valve 20 of the first temperature control system 14 to be in the second state. Because the second duct 24 and the third duct 26 are in communication in the second state, the heated air is supplied to the low voltage battery 10. This allows the low voltage battery 10 to be heated, thereby returning the temperature of the low voltage battery 10 to within the appropriate temperature range.

If the temperature of the air heated by the air heater 30 is lower than or equal to the temperature of the low voltage battery 10, the low voltage battery 10 may not be sufficiently heated by the air heated by the air heater 30. Therefore, in such a case, heating of the low voltage battery 10 is executed by the second temperature control system 16. That is, if the temperature of the air heated by the air heater 30 is lower than or equal to the temperature of the low voltage battery 10, the temperature controller 120 executes heating of the low voltage battery 10 using the second temperature control system 16. In more detail, the temperature controller 120 causes the third switching valve 70*c* and the fourth switching valve 70*d* to be in a state in which the second common piping 66 and the heating piping 62 are in communication. In addition, the temperature controller 120 causes the fifth switching valve 70*e* and the sixth switching valve 70*f* to be in a state in which the second common piping 66 is blocked from the cooling piping 64. By allowing the second common piping 66 and the heating piping 62 to be in communication, the heat medium heated by the heater 74 is supplied to the second heat exchanger 52 through the heating piping 62 and the second common piping 66. This allows the low voltage battery 10 to be heated, thereby returning the temperature of the low voltage battery 10 to within the appropriate temperature range.

By the way, in an environment where the low voltage battery 10 is cooled, such as when the temperature outside the vehicle 2 is below freezing, even if the low voltage battery 10 is heated by the first temperature control system 14 for a long time, a situation may occur in which the temperature of the low voltage battery 10 does not return to within the appropriate temperature range.

Accordingly, when a certain time has elapsed since the time point at which the low voltage battery 10 is started to be heated by the first temperature control system 14, the temperature controller 120 may stop heating the low voltage battery 10 using the first temperature control system 14 and switch to heating the low voltage battery 10 using the second temperature control system 16. Heating with a heat medium usually has a higher heating capability than heating with heated air. From this, heating is switched from heating using the first temperature control system 14 to heating using the second temperature control system 16, which has a higher heating capability than the first temperature control system 14.

For example, the temperature controller 120 causes the three-way valve 20 of the first temperature control system 14 to be in the fourth state. The temperature controller 120 causes the third switching valve 70*c* and the fourth switching valve 70*d* to be in a state in which the second common piping 66 and the heating piping 62 are in communication. In addition, the temperature controller 120 causes the fifth switching valve 70*e* and the sixth switching valve 70*f* to be in a state in which the second common piping 66 is blocked from the cooling piping 64. This allows the low voltage battery 10 to be further heated, thereby returning the temperature of the low voltage battery 10 to within the appropriate temperature range, even in an environment where the low voltage battery 10 is cooled.

Here, heating of the low voltage battery 10 using the first temperature control system 14 is stopped, and then heating using the first temperature control system 14 is switched to heating using the second temperature control system 16. However, the temperature controller 120 may continue to heat the low voltage battery 10 using the first temperature control system 14, and further may additionally heat the low voltage battery 10 using the second temperature control system 16.

When the temperature of the low voltage battery 10 is within the appropriate temperature range, the temperature controller 120 derives the temperature of the mixed air of the heated air and the unheated air. For example, the temperature controller 120 derives the average of the temperature detected by the intake air temperature sensor 104 and the temperature detected by the heated air temperature sensor 106 as the temperature of the mixed air. Then, the temperature controller 120 determines whether the derived temperature of the mixed air is within the appropriate temperature range of the low voltage battery 10.

If the temperature of the mixed air is within the appropriate temperature range of the low voltage battery 10, the temperature controller 120 supplies the mixed air to the low voltage battery 10 to maintain the temperature of the low voltage battery 10 within the appropriate temperature range. This can suppress the temperature of the low voltage battery 10 from falling outside the appropriate temperature range.

Figure 3:
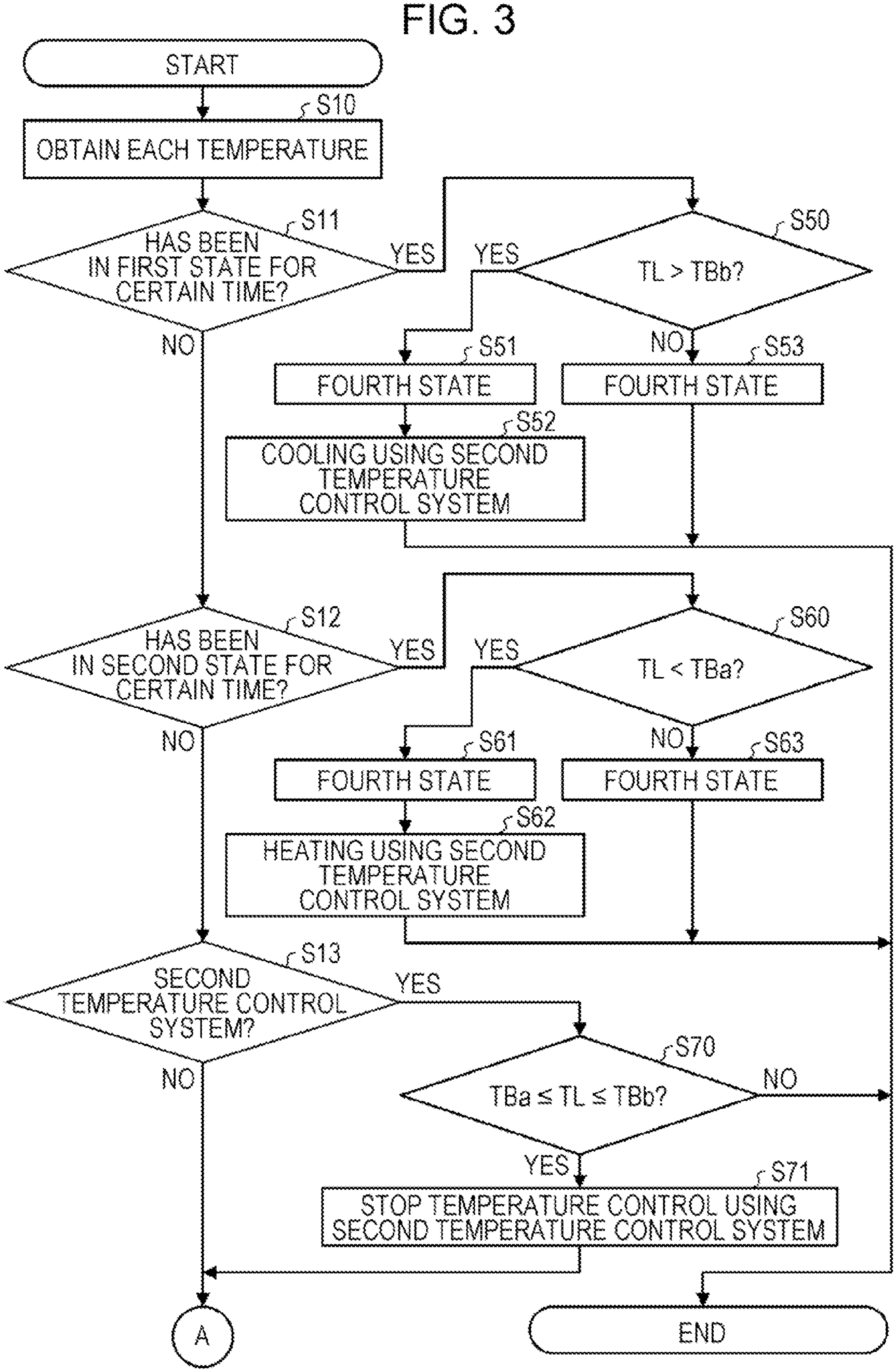
FIG. 3 is a flowchart illustrating the flow of control of a temperature controller.
Figure 4:
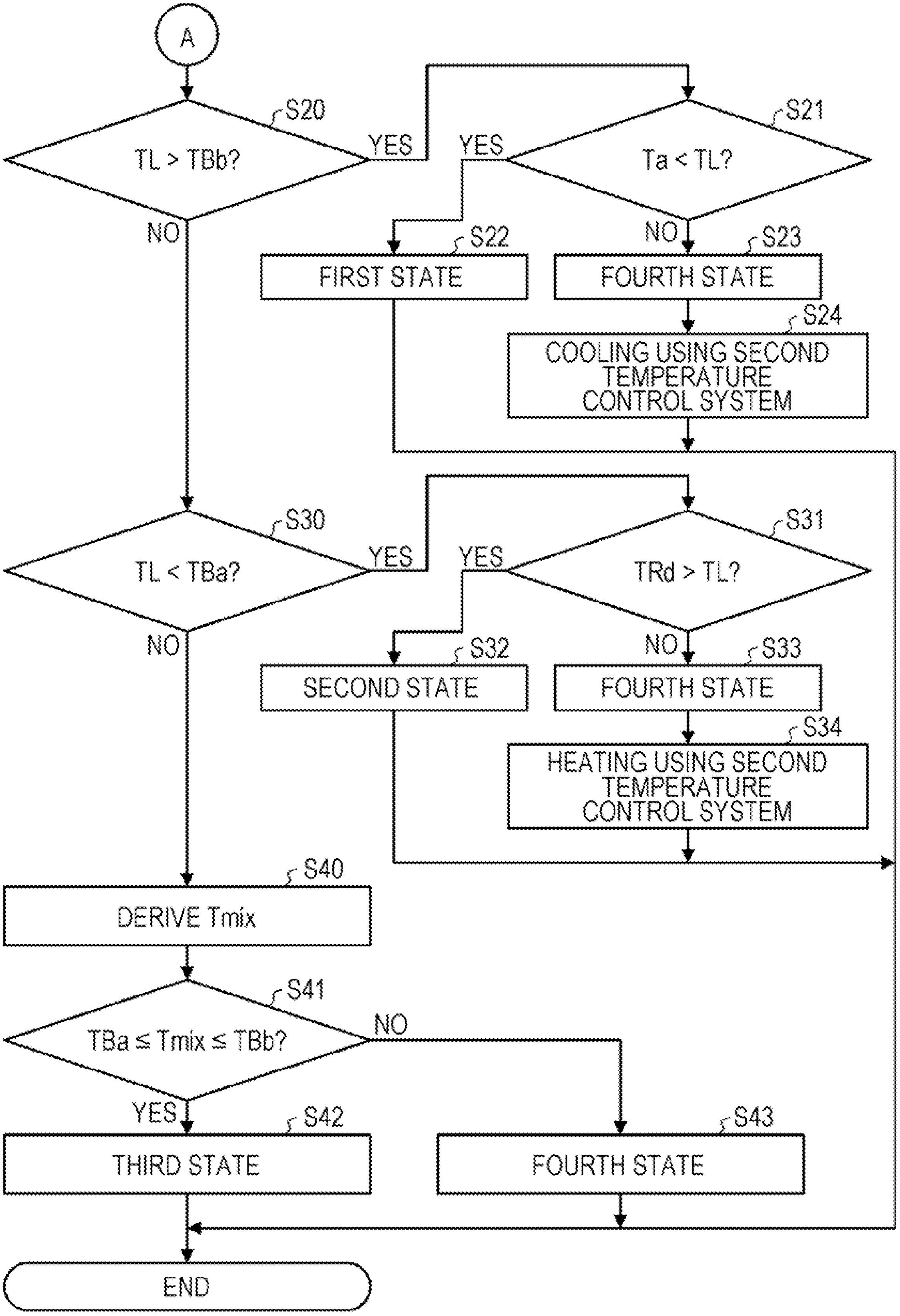
FIG. 4 is a flowchart illustrating the flow of control of the temperature controller.

FIGS. 3 and 4 are flowcharts illustrating the flow of control of the temperature controller 120. "A" in FIG. 3 leads to "A" in FIG. 4. In FIGS. 3 and 4, the temperature control of the low voltage battery 10 will be described, and the description of the temperature control of the high voltage battery 12 will be omitted.

In FIGS. 3 and 4, "TL" indicates the temperature detected by the first battery temperature sensor 100, which is the temperature of the low voltage battery 10. "TBa" indicates the lower limit temperature of the appropriate temperature range of the low voltage battery 10. "TBb" indicates the upper limit temperature of the appropriate temperature range of the low voltage battery 10. "Ta" indicates the temperature detected by the intake air temperature sensor 104, which is the temperature of unheated air of the air supplied to the first temperature control system 14, i.e., the temperature of the unheated air. "TRd" indicates the temperature detected by the heated air temperature sensor 106, which is the temperature of air heated by the air heater 30 of the air supplied to the first temperature control system 14, i.e., the temperature of the heated air. "Tmix" indicates the temperature of the mixed air.

The temperature controller 120 repeatedly performs the processes in FIGS. 3 and 4 each time a certain interrupt time point arrives, which arrives each time a certain time elapses. As illustrated in FIG. 3, when a certain interrupt time point arrives, the temperature controller 120 obtains the temperature "TL" of the low voltage battery 10, the temperature "Ta" of the unheated air, and the temperature "TRd" of the heated air (S10).

When the three-way valve 20 of the first temperature control system 14 has not been in the first state for a certain time (NO in S11) and has not been in the second state for a certain time (NO in S12), the temperature controller 120 proceeds to the processing in step S13.

When the low voltage battery 10 is not currently temperature-controlled by the second temperature control system 16 in step S13 (NO in S13), the temperature controller 120 proceeds from "A" in FIG. 3 to "A" in FIG. 4, and proceeds to the processing in step S20 in FIG. 4.

In step S20, the temperature controller 120 determines whether the temperature "TL" of the low voltage battery 10 is higher than the upper limit temperature "TBb" of the appropriate temperature range (S20).

When the temperature "TL" of the low voltage battery 10 is higher than the upper limit temperature "TBb" of the appropriate temperature range (YES in S20), the temperature controller 120 determines whether the temperature "Ta" of the unheated air is lower than the temperature "TL" of the low voltage battery 10 (S21).

When the temperature "Ta" of the unheated air is lower than the temperature "TL" of the low voltage battery 10 (YES in S21), the temperature controller 120 sets the state of the three-way valve 20 of the first temperature control system 14 to the first state in which the unheated air is supplied to the low voltage battery 10 through the three-way valve 20 (S22), and ends the series of processes. Note that, if the state of the three-way valve 20 is already the first state, the first state is maintained. Accordingly, the low voltage battery 10 is cooled by the first temperature control system 14.

When the temperature "Ta" of the unheated air is greater than or equal to the temperature "TL" of the low voltage battery 10 (NO in S21), the temperature controller 120 sets the state of the three-way valve 20 of the first temperature control system 14 to the fourth state in which the flow path between the three-way valve 20 and the low voltage battery 10 is blocked (S23). Note that, if the state of the three-way valve 20 is already the fourth state, the fourth state is maintained. Then, the temperature controller 120 executes cooling of the low voltage battery 10 using the second temperature control system 16 (S24), and ends the series of processes. Note that, when the low voltage battery 10 is already being cooled by the second temperature control system 16, cooling of the low voltage battery 10 using the second temperature control system 16 is continued.

When the temperature "TL" of the low voltage battery 10 is lower than or equal to the upper limit temperature "TBb" of the appropriate temperature range in step S20 (NO in S20), the temperature controller 120 determines whether the temperature "TL" of the low voltage battery 10 is lower than the lower limit temperature "TBa" of the appropriate temperature range (S30).

When the temperature "TL" of the low voltage battery 10 is lower than the lower limit temperature "TBa" of the appropriate temperature range (YES in S30), the temperature controller 120 determines whether the temperature "TRd" of the heated air is higher than the temperature "TL" of the low voltage battery 10 (S31).

When the temperature "TRd" of the heated air is higher than the temperature "TL" of the low voltage battery 10 (YES in S31), the temperature controller 120 sets the state of the three-way valve 20 of the first temperature control system 14 to the second state in which the heated air is supplied to the low voltage battery 10 through the three-way valve 20 (S32), and ends the series of processes. Note that, if the state of the three-way valve 20 is already the second state, the second state is maintained. Accordingly, the low voltage battery 10 is heated by the first temperature control system 14.

When the temperature "TRd" of the heated air is lower than or equal to the temperature "TL" of the low voltage battery 10 (NO in S31), the temperature controller 120 sets the state of the three-way valve 20 of the first temperature control system 14 to the fourth state in which the flow path between the three-way valve 20 and the low voltage battery 10 is blocked (S33). Note that, if the state of the three-way valve 20 is already the fourth state, the fourth state is maintained. Then, the temperature controller 120 executes heating of the low voltage battery 10 using the second temperature control system 16 (S34), and ends the series of processes. Note that, when the low voltage battery 10 is already being heated by the second temperature control system 16, heating of the low voltage battery 10 using the second temperature control system 16 is continued.

When the temperature "TL" of the low voltage battery 10 is lower than or equal to the upper limit temperature "TBb" of the appropriate temperature range (NO in S20) and greater than or equal to the lower limit temperature "TBa" of the appropriate temperature range (NO in S30), this corresponds to the case where the temperature "TL" of the low voltage battery 10 is within the appropriate temperature range. In this case, the temperature controller 120 derives the temperature "Tmix" of the mixed air (S40).

The temperature controller 120 determines whether the derived temperature "Tmix" of the mixed air is greater than or equal to the lower limit temperature "TBa" of the appropriate temperature range of the low voltage battery 10 and lower than or equal to the upper limit temperature "TBb", that is, whether the temperature "Tmix" falls within the appropriate temperature range of the low voltage battery 10 (S41).

When it is determined that the temperature "Tmix" of the mixed air falls within the appropriate temperature range of the low voltage battery 10 (YES in S41), the temperature controller 120 sets the state of the three-way valve 20 of the first temperature control system 14 to the third state in which the mixed air is supplied to the low voltage battery 10 (S42), and ends the series of processes. Note that, if the state of the three-way valve 20 is already the third state, the third state is maintained. Accordingly, the mixed air is supplied to the low voltage battery 10, and, with the mixed air, the temperature of the low voltage battery 10 is maintained to within the appropriate temperature range.

When it is determined that the temperature "Tmix" of the mixed air does not fall within the appropriate temperature range of the low voltage battery 10 (NO in S41), the temperature controller 120 sets the state of the three-way valve 20 of the first temperature control system 14 to the fourth state in which the flow path between the three-way valve 20 and the low voltage battery 10 is blocked (S43), and ends the series of processes. If the state of the three-way valve 20 is already the fourth state, the fourth state is maintained. In this case, no temperature control of the low voltage battery 10 is performed, but, since the low voltage battery 10 already falls within the appropriate temperature range, the low voltage battery 10 can be appropriately charged or discharged even if the temperature control of the low voltage battery 10 is not performed.

When the three-way valve 20 of the first temperature control system 14 has been in the first state for a certain time in step S11 in FIG. 3 (YES in S11), the temperature controller 120 determines whether the temperature "TL" of the low voltage battery 10 is higher than the upper limit temperature "TBb" of the appropriate temperature range (S50).

When the temperature "TL" of the low voltage battery 10 is higher than the upper limit temperature "TBb" of the appropriate temperature range (YES in S50), the temperature controller 120 sets the three-way valve 20 of the first temperature control system 14 to the fourth state in which the flow path between the three-way valve 20 and the low voltage battery 10 is blocked (S51). Then, the temperature controller 120 executes cooling using the second temperature control system 16 (S52), and ends the series of processes. In this case, even if cooling using the first temperature control system 14 is continued for a certain time, the temperature "TL" of the low voltage battery 10 does not return to within the appropriate temperature range, and thus cooling using the first temperature control system 14 is switched to cooling using the second temperature control system 16. This makes it easier for the temperature of the low voltage battery 10 to return to within the appropriate temperature range.

When it is determined that the temperature "TL" of the low voltage battery 10 is lower than or equal to the upper limit temperature "TBb" of the appropriate temperature range (NO in S50), the temperature controller 120 sets the three-way valve 20 of the first temperature control system 14 to the fourth state in which the flow path between the three-way valve 20 and the low voltage battery 10 is blocked (S53), and ends the series of processes. In this case, because cooling using the first temperature control system 14 is continued for a certain time, the temperature of the low voltage battery 10 returns to within the appropriate temperature range, and thus cooling of the low voltage battery 10 using the first temperature control system 14 is stopped.

When the three-way valve 20 of the first temperature control system 14 has been in the second state for a certain time in step S12 (YES in S12), the temperature controller 120 determines whether the temperature "TL" of the low voltage battery 10 is lower than the lower limit temperature "TBa" of the appropriate temperature range (S60).

When the temperature "TL" of the low voltage battery 10 is lower than the lower limit temperature "TBa" of the appropriate temperature range (YES in S60), the temperature controller 120 sets the three-way valve 20 of the first temperature control system 14 to the fourth state in which the flow path between the three-way valve 20 and the low voltage battery 10 is blocked (S61). Then, the temperature controller 120 executes heating using the second temperature control system 16 (S62), and ends the series of processes. In this case, even if heating using the first temperature control system 14 is continued for a certain time, the temperature "TL" of the low voltage battery 10 does not return to within the appropriate temperature range, and thus heating using the first temperature control system 14 is switched to heating using the second temperature control system 16. This makes it easier for the temperature of the low voltage battery 10 to return to within the appropriate temperature range.

When it is determined that the temperature "TL" of the low voltage battery 10 is greater than or equal to the lower limit temperature "TBa" of the appropriate temperature range (NO in S60), the temperature controller 120 sets the three-way valve 20 of the first temperature control system 14 to the fourth state in which the flow path between the three-way valve 20 and the low voltage battery 10 is blocked (S63), and ends the series of processes. In this case, because heating using the first temperature control system 14 is continued for a certain time, the temperature of the low voltage battery 10 returns to within the appropriate temperature range, and thus heating of the low voltage battery 10 using the first temperature control system 14 is stopped.

When the low voltage battery 10 is currently being temperature-controlled by the second temperature control system 16 in step S13 (YES in S13), the temperature controller 120 determines whether the temperature "TL" of the low voltage battery 10 is greater than or equal to the lower limit temperature "TBa" of the appropriate temperature range and lower than or equal to the upper limit temperature "TBb" of the appropriate temperature range, i.e., within the appropriate temperature range (S70).

When the temperature "TL" of the low voltage battery 10 is within the appropriate temperature range (YES in S70), the temperature controller 120 stops the temperature control of the low voltage battery 10 using the second temperature control system 16 (S71), and proceeds to the processing in step S20 described above.

When the temperature "TL" of the low voltage battery 10 is not within the appropriate temperature range (NO in S70), the temperature controller 120 ends the series of processes. In this case, the temperature control of the low voltage battery 10 using the second temperature control system 16 is continued.

As described above, the battery temperature control apparatus 1 of the present embodiment includes the first temperature control system 14 capable of adjusting the temperature of the low voltage battery 10 and the second temperature control system 16 capable of adjusting the temperature of the high voltage battery 12. The second temperature control system 16 not only includes the first heat exchanger 50 capable of exchanging heat with the high voltage battery 12, but also includes the second heat exchanger 52 capable of exchanging heat with the low voltage battery 10. The battery temperature control apparatus 1 of the present embodiment is configured to be capable of adjusting the temperature of the low voltage battery 10 using a heat medium supplied to the second heat exchanger 52 of the second temperature control system 16.

With such a configuration, the battery temperature control apparatus 1 of the present embodiment can switch between the first temperature control system 14 and the second temperature control system 16 in accordance with the temperature control capability of the first temperature control system 14, the heat generation state of the low voltage battery 10, and so on. This makes it possible for the battery temperature control apparatus 1 of the present embodiment to appropriately adjust the temperature of the low voltage battery 10.

In addition, the battery temperature control apparatus 1 of the present embodiment can perform the temperature control of the low voltage battery 10 using the first temperature control system 14, and perform the temperature control of the high voltage battery 12 using the second temperature control system 16. This makes it possible for the battery temperature control apparatus 1 of the present embodiment to control the temperature of the low voltage battery 10 and the temperature of the high voltage battery 12 independently of each other.

Therefore, according to the battery temperature control apparatus 1 of the present embodiment, the temperature of the low voltage battery 10 and the temperature of the high voltage battery 12 can be appropriately adjusted.

Moreover, the temperature controller 120 of the battery temperature control apparatus 1 of the present embodiment executes cooling of the low voltage battery 10 using the first temperature control system 14 if the temperature of the unheated air is lower than the temperature of the low voltage battery 10. The temperature controller 120 executes cooling of the low voltage battery 10 using the second temperature control system 16 if the temperature of the unheated air is greater than or equal to the temperature of the low voltage battery 10. This makes it possible for the battery temperature control apparatus 1 of the present embodiment to reliably cool the low voltage battery 10 irrespective of the temperature of the unheated air.

In addition, the temperature controller 120 of the battery temperature control apparatus 1 of the present embodiment executes heating of the low voltage battery 10 using the first temperature control system 14 if the temperature of the heated air is higher than the temperature of the low voltage battery 10. The temperature controller 120 executes heating of the low voltage battery 10 using the second temperature control system 16 if the temperature of the heated air is lower than or equal to the temperature of the low voltage battery 10. This makes it possible for the battery temperature control apparatus 1 of the present embodiment to reliably heat the low voltage battery 10 irrespective of the temperature of the heated air.

In addition, if the temperature of the mixed air is within the appropriate temperature range of the low voltage battery 10, the temperature controller 120 of the battery temperature control apparatus 1 of the present embodiment supplies the mixed air to the low voltage battery 10, thereby maintaining, with the mixed air, the temperature of the low voltage battery 10 within the appropriate temperature range. This makes it possible for the battery temperature control apparatus 1 of the present embodiment to suppress the temperature of the low voltage battery 10 from falling outside the appropriate temperature range.

In addition, the first temperature control system 14 of the battery temperature control apparatus 1 of the present embodiment includes the three-way valve 20. The first port 32 of the three-way valve 20 is in communication with the air inlet 28, the second port 34 of the three-way valve 20 is in communication with the air heater 30, and the third port 36 of the three-way valve 20 is in communication with the low voltage battery 10. The three-way valve 20 is configured to be capable of switching at least between the first state in which the first port 32 and the third port 36 are in communication and the second state in which the second port 34 and the third port 36 are in communication. This makes it possible for the battery temperature control apparatus 1 of the present embodiment to reliably perform temperature control of the low voltage battery 10 using the first temperature control system 14, both when the temperature of the low voltage battery 10 is higher than the upper limit temperature of the appropriate temperature range and when the temperature is lower than the lower limit temperature.

Although the embodiment of the disclosure has been described above with reference to the accompanying drawings, it goes without saying that the disclosure is not limited to the embodiment. It is clear for those skilled in the art to be able to conceive of various changes or modifications within the scope described in the claims, and it is understood that they also naturally fall within the technical scope of the disclosure.

The control device 18 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control device 18 including the temperature controller 120. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A battery temperature control apparatus comprising:
a high voltage battery installed in a vehicle;
a low voltage battery installed in the vehicle;
a first temperature control system configured to adjust a temperature of the low voltage battery using air supplied from outside the vehicle; and
a second temperature control system that is different from the first temperature control system, the second temperature control system being configured to adjust a temperature of the high voltage battery using a heat medium circulating within the vehicle, wherein
the second temperature control system comprises
a first heat exchanger configured to exchange heat between the high voltage battery and the heat medium, and
a second heat exchanger configured to exchange heat between the low voltage battery and the heat medium, and
the temperature of the low voltage battery is adjustable using the heat medium supplied to the second heat exchanger,
the first temperature control system comprises:
an air inlet configured to obtain air from outside the vehicle;
an air heater configured to heat air supplied to the first temperature control system;
a three-way valve that has a first port, a second port, and a third port, the three-way valve being configured to switch an internal flow path leading to the first port, the second port, and the third port;
a first duct configured to allow the first port of the three-way valve to be in communication with the air inlet;
a second duct configured to allow the second port of the three-way valve to be in communication with the air heater; and
a third duct configured to allow the third port of the three-way valve to be in communication with the low voltage battery, and
the three-way valve is configured to switch at least between a first state in which the first port and the third port are in communication and a second state in which the second port and the third port are in communication.

2. The battery temperature control apparatus according to claim 1, further comprising:
a control device comprising
one or more processors, and
one or more memories coupled to the one or more processors,
wherein the one or more processors are configured to execute a process comprising
comparing a temperature of air supplied to the first temperature control system and the temperature of the low voltage battery when the temperature of the low voltage battery is higher than an upper limit temperature of an appropriate temperature range,
executing cooling of the low voltage battery using the first temperature control system when the temperature of the air supplied to the first temperature control system is lower than the temperature of the low voltage battery, and
executing cooling of the low voltage battery using the second temperature control system when the temperature of the air supplied to the first temperature control system is greater than or equal to the temperature of the low voltage battery.

3. The battery temperature control apparatus according to claim 1, further comprising:
a control device comprising
one or more processors, and
one or more memories coupled to the one or more processors, wherein
the one or more processors are configured to execute a process comprising
comparing a temperature of heated air that is air heated by the air heater and the temperature of the low voltage battery when the temperature of the low voltage battery is lower than a lower limit temperature of an appropriate temperature range,
executing heating of the low voltage battery using the first temperature control system when the temperature of the heated air is higher than the temperature of the low voltage battery, and
executing heating of the low voltage battery using the second temperature control system when the temperature of the heated air is lower than or equal to the temperature of the low voltage battery.

4. The battery temperature control apparatus according to claim 1, further comprising:
a control device comprising:
one or more processors, and
one or more memories coupled to the one or more processors, wherein
the one or more processors are configured to execute a process comprising
when the temperature of the low voltage battery is within an appropriate temperature range, deriving a temperature of mixed air of heated air and unheated air, the heated air being air heated by the air heater of air supplied to the first temperature control system, the unheated air being air unheated by the air heater of the air supplied to the first temperature control system,
determining whether the temperature of the mixed air is within the appropriate temperature range of the low voltage battery, and
when the temperature of the mixed air is within the appropriate temperature range of the low voltage battery, supplying the mixed air to the low voltage battery to maintain, with the mixed air, the temperature of the low voltage battery within the appropriate temperature range.

* * * * *